United States Patent
Sauer et al.

[19]

[11] Patent Number: 5,861,834
[45] Date of Patent: Jan. 19, 1999

[54] VIRTUAL NOISE RADAR WAVEFORM FOR REDUCED RADAR DETECTABILITY

[75] Inventors: Mark F. Sauer, St. Louis; Larry R. Kremer, Florissant; John A. Ziegler, St. Louis, all of Mo.

[73] Assignee: Esco Electronics Corporation, St. Louis, Mo.

[21] Appl. No.: 24,003

[22] Filed: Feb. 14, 1998

Related U.S. Application Data

[63] Continuation-in-part of Ser. No. 656,863, May 30, 1996, Pat. No. 5,719,579.

[51] Int. Cl.[6] .................................................. G01S 7/38
[52] U.S. Cl. ........................................... 342/13; 342/194
[58] Field of Search .............................. 342/13, 194, 130, 342/200

[56] References Cited

U.S. PATENT DOCUMENTS 4,706,093 11/1987 Groth, Jr. ..................................... 375/1
5,053,772 10/1991 Lamper et al. ............................ 342/25
5,055,850 10/1991 Lamper et al. .......................... 342/201
5,075,863 12/1991 Nagamune et al. ..................... 342/130
5,719,579  2/1998 Torre et al. ................................ 342/13

*Primary Examiner*—Daniel T. Pihulic
*Attorney, Agent, or Firm*—Polster, Lieder, Woodruff & Lucchesi LC

[57] ABSTRACT

Apparatus (10) for generating a radar waveform (W). A noise generator (20) generates a series of pulses in a pseudo-random pattern, and a frequency generator (16) generates a carrier wave having a frequency within a predetermined band of frequencies. The carrier wave is modulated with the pseudo-random pattern of pulses, and the resulting modulated carrier wave passed through both a filter (30) and an attenuator (32) to suppress any discernible feature or signal characteristics of the resulting waveform. The modulated carrier is transmitted by an antenna (42) and a received return signal is processed by a signal processor (100) to obtain pertinent information about a target. The transmitted waveform has no discernible attributes by which the waveform, if processed and analyzed by someone else's radar detector (E) would convey any intelligence as to the presence or source of the transmitted waveform.

30 Claims, 8 Drawing Sheets

279.e-6   280.e-6  281.e-6  282.e-6   283.e-6  284.e-6   285.e-6

VIRTUAL NOISE RADAR WAVEFORM FOR REDUCED RADAR DETECTABILITY

CROSS REFERENCE TO RELATED APPLICATIONS

This application is a continuation-in-part (CIP) of application Ser. No. 08/656,863 filed May 30, 1996, now U.S. Pat. No. 5,719,579.

STATEMENT REGARDING FEDERALLY SPONSORED RESEARCH OR DEVELOPMENT

Not applicable.

BACKGROUND OF THE INVENTION

This invention relates to communication systems including radar systems, and more particularly, to a virtual noise waveform as generated by a radar system. The waveform has no detectable attributes discernible by radar signal detection and analysis equipment. This allows a radar system utilizing the waveform to obtain desired intelligence without disclosing either the presence of the radar or whose radar it is.

A primary usage of radar systems is intelligence gathering. In a military or covert operations setting, this requires a radar platform to interrogate an area of interest using radar signals which are transmitted at a target, and to receive return signals which can be processed to obtain the desired information. Different radar systems have different signal characteristics or attributes. These include, for example, whether the radar is pulsed or continuous wave (CW), its energy, operating frequencies, frequency hop rates, chip rates, coding schemes, etc. A conventional radar system typically generates a high energy, uncoded signal which is readily detectable with the appropriate equipment. Radar systems used for military or covert purposes employ different schemes to hide or disguise their transmitted signals. For example, a covert radar signal will have less radiated energy than a conventional signal, and employ a different coding scheme. Regardless, it has been found that these signals, too, are detectable. It will be understood that while the attributes or signal characteristics of one radar system may significantly vary from those of another, the characteristics of each represent an individualized signature. Accordingly, someone detecting a radar signal above some threshold in a radar band and performing appropriate signal analysis can readily determine not only that intelligence gathering is taking place, but also who is doing it.

Detection avoidance techniques are well-known in the art. Among detection avoidance methods employed by current radar systems are the use of terrain masking, power management, adaptive scanning, pulse compression, and frequency diversity techniques. Terrain masking (which has been ostensibly used since World War II) requires an airplane, for example, to fly close to the nap of the earth. Power management involves the radar generating only the signal power necessary for a particular task. Adaptive scanning involves transmitting radar signals only on a limited basis, and then focusing the transmission only in the target direction. Pulse compression techniques are used to distribute the transmissible energy over time; while, frequency diversification involves spreading the available energy over a wide spectrum. While each of these techniques has certain advantages which to some extent may mask a radar, implementation of any of these avoidance strategies still results in a radar waveform having an identifiable set of characteristics. If the waveform is detected despite any of the avoidance strategies employed, the waveform characteristics will again provide a signature by which the source of the radar signal can be determined. It would be greatly advantageous and desirable to employ a radar system having detection avoidance capabilities in which a signal waveform would have no discernible attributes from which would aid in the detection of the source of the signal.

BRIEF SUMMARY OF THE INVENTION

Among the several objects of the present invention may be noted the provision of apparatus and a method for generating a virtual noise waveform and especially a difficult to detect radar waveform transmissible from an appropriate radar platform to obtain desired information about a target of interest;

the provision of such an apparatus and method for producing a virtual noise waveform having no discernible waveform attributes, other than signal energy, so a resulting radar signal will appear as a random pattern of noise and will not reveal any information either as to its existence or the source of the waveform to an investigator;

the provision of such an apparatus and method to generate pseudo-random pulses simulating noise and converting the pulses into a virtual noise waveform based upon a pulse signaling model;

the provision of such apparatus and method in which the pseudo-random pulses are based upon a complementary code sequence to improve range sidelobes of the processed waveform;

the provision of such an apparatus and method to further employ coherent frequency hopping and continuous phasing techniques to generate a carrier frequency modulated by the virtual noise waveform;

the provision of such an apparatus and method in which the signal characteristics of the modulated waveform are suppressed so as to not be discernible by another;

the provision of such an apparatus and method in which suppression of the modulated carrier waveform includes filtering the waveform so the output power of the transmitted waveform is confined to a narrow bandwidth within each frequency hop interval;

the provision of such an apparatus and method in which the bandwidth of the filter is sufficiently narrow that the resulting signal strength of the transmitted waveform is significantly reduced, but in which the bandwidth is sufficiently broad to be equivalent to the number of coded data bits required to be transmitted to obtain desired intelligence about a target;

the provision of such an apparatus and method in which suppression of the modulated waveform further includes controllably attenuating the filtered waveform so that while the transmitted waveform has no excess power level, a received return waveform has sufficient signal strength so it can be processed to obtain the desired intelligence about the target;

the provision of such an apparatus and method to produce a radar signal usable in a wide variety of radar applications similar to those for which conventional military or covert radar signals are used, without any degradation in the performance of the radar system; and the provision of such an apparatus and method which can be implemented using existing radar systems.

In accordance with the invention, generally stated, apparatus is provided for generating a virtual waveform and in particular for generating a radar waveform. A pseudo-random noise generator generates a series of pulses in a pseudo-random pattern. The pulses are converted into a desired waveform. A frequency generator generates a carrier wave having a frequency within a predetermined band of frequencies. The carrier wave is then modulated by the waveform. The resultant modulated carrier wave is now filtered and attenuated to suppress any discernible waveform characteristics. The result is a virtual noise waveform. An antenna propagates the waveform and receives a return waveform which is processed to obtain desired target information. Because the transmitted waveform has no discernible attributes; the waveform, if received and analyzed by detection apparatus other than that of the apparatus of the invention, would convey no information either as to its presence or as to its source. As a method, the invention involves generating a series of pulses having a pseudo-random pattern, converting the pulses into a modulating waveform, and generating a carrier wave having a frequency within a predetermined band of frequencies. Next, the method includes modulating the carrier wave and filtering and attenuating the resulting modulated waveform to suppress any identifiable characteristics thereof and create a virtual noise waveform. The method then requires transmitting the virtual noise waveform and receiving a return waveform which is processed to obtain desired information, the transmitted waveform having no discernible attributes which would convey any intelligence as to either the presence of the waveform or the source of the transmission. Other objects and features will be in part apparent and in part pointed out hereinafter.

BRIEF DESCRIPTION OF THE SEVERAL VIEWS OF THE DRAWINGS

In the drawings.

FIGS. 3–5 are block diagrams representing current types of feature detectors used to sense the presence of a radar waveform and identify the source of the waveform wherein FIG. 3 is a block diagram for a $n^{th}$ law detector for detecting radar carrier frequencies, FIG. 4 is a delay detector for detecting chip rate of a radar signal, and FIG. 5 is a split band detector for sensing the hop rate of a radar signal;

Corresponding reference characters indicate corresponding parts throughout the drawings.

DETAILED DESCRIPTION OF THE INVENTION

Figure 12:
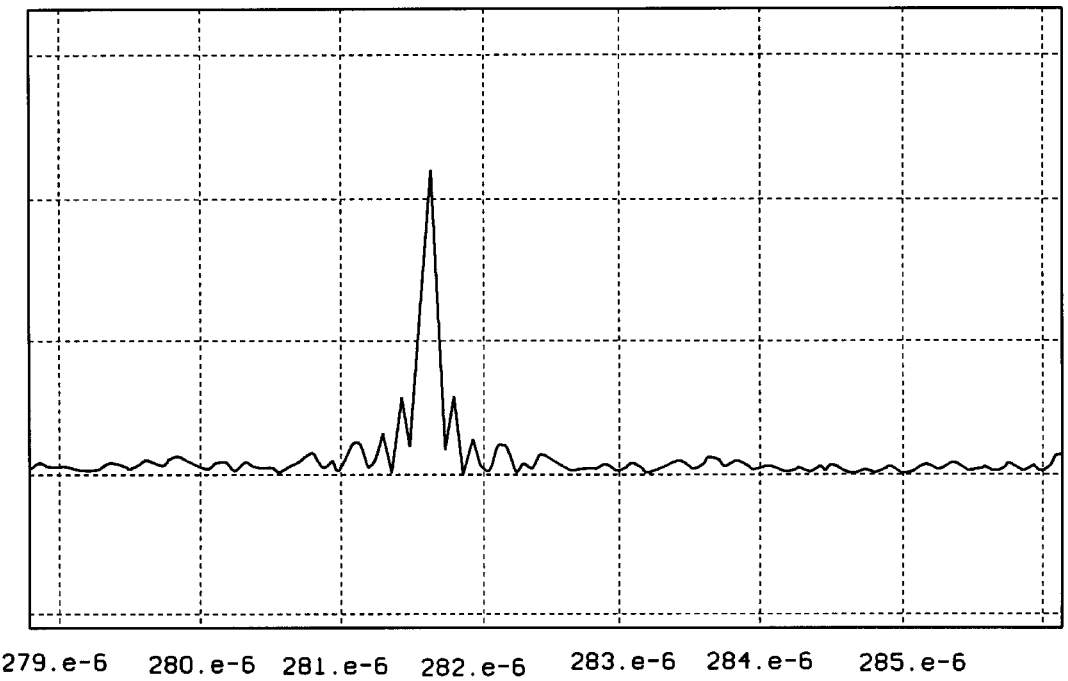
FIG. 12 represents a radar ranging signal indicating range to a target after signal processing.
Figure 13:
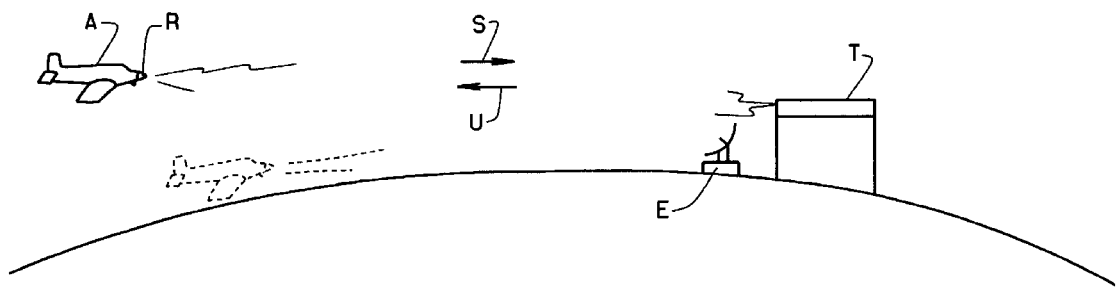
FIG. 13 illustrates an airborne radar system used to collect intelligence.

Referring to the drawings, in FIG. 13, a radar platform comprises an aircraft A in which a radar system R is installed. It will be understood, however, that the invention, as described hereinafter, may be used with any radar platform. To obtain information about a target T of interest requires that the airplane be located at some distance relative to the object and that the radar system generate and transmit a radar signal S generally in the direction of the target. As is well known in the art, the radar signal has a number of characteristics. These include the strength of the signal (transmitted power), frequency, coding, etc. When the radar signal illuminates the target, a return signal U is reflected back toward the airplane. When the return signal is received, it is processed by the radar system to produce desired intelligence information about the target. In FIG. 12, a ranging signal is shown which is typical of the type of information to be obtained by a radar system.

Figure 3:
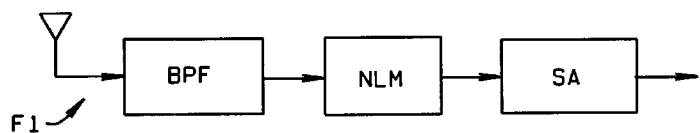
Figure 4:
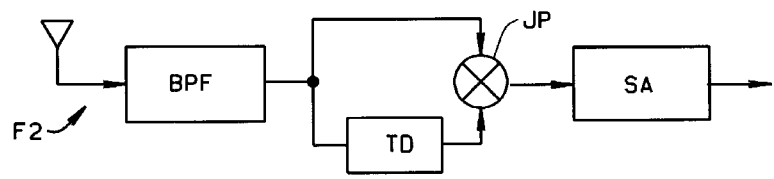
Figure 5:
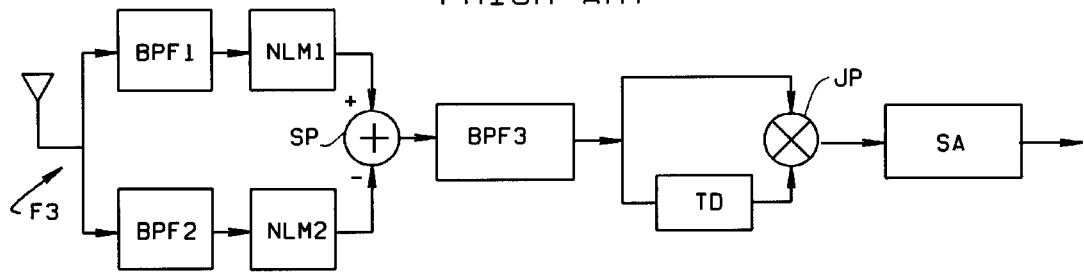
Figure 6A:
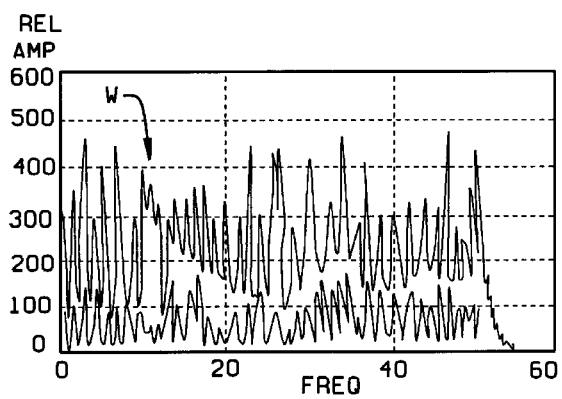
FIG. 6A represents a detected radar waveform, and FIG. 6B the output of a square law detector to which the detected waveform is applied.
Figure 6B:
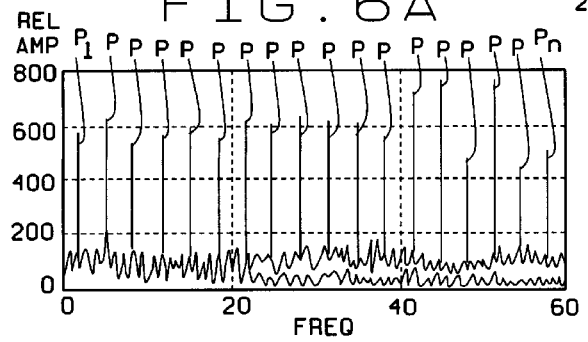

In covert intelligence gathering operations, the radar signal from the airplane is detectable by a surveillance system E. The surveillance system does not necessarily know of the presence of radar R, but rather scans known radar frequency bandwidths. As a result, the surveillance system may obtain a detected waveform W such as shown in FIG. 6A. The surveillance includes a variety of feature detectors whose function are to analyze the waveform and determine whether or not any discernible features are present by which the waveform W could be determined to have been transmitted by a particular radar system. Knowing the characteristics of a radar system essentially identifies the source of the radar signal. In FIGS. 3–5, three different types of feature detectors are respectively designated F1–F3. Detector F1 in FIG. 3 is an n law detector such as a square law type detector; although, quad law and hex law detectors are also used. The sensed waveform is applied to a bandpass filter BPF, and then to a square law detector module NLM. The output of the detector module is displayed by a spectrum analyzer SA. The output displayed by the spectrum analyzer is a waveform pattern such as shown in FIG. 6B. Here, the waveform W is shown to have a series of readily identifiable peaks P1 . . . Pn. Because of the occurrence of these peaks, it is first clear that the waveform W is not merely comprised of randomly occurring noise. Secondly, by ascertaining the respective frequencies at which the peaks occur, it is possible to particularly identify the source of the signal.

In addition to the n law detector F1, a chip rate or bit coding detector F2 is used. Here, the filtered waveform is split into two paths. The waveform is then recombined at a junction point JP with the waveform on one of the paths having first been passed through a time delay TD. Again, the resulting waveform is displayed by a spectrum analyzer SA.

For determining hop rate of a detected waveform or the rate at which the radar waveform is shifted from one carrier frequency to another, the third feature detector F3 is used. Here, the detected waveform is again split and routed over two paths to a summing point SP. Along one path is a first bandpass filter and square law detector BPF1 and NLM1 respectively. Along the other path is a second bandpass filter and square law detector BPF2 and NLM2. At summing point SP, the two waveforms are additively combined with the result being passed through a third bandpass filter BPF3. The waveform is again split in two and routed over separate paths. The segments are recombined at a junction point JP with one of the segments having again first been passed through a time delay TD. Again, the results are displayed on a spectrum analyzer SA.

Figure 8:
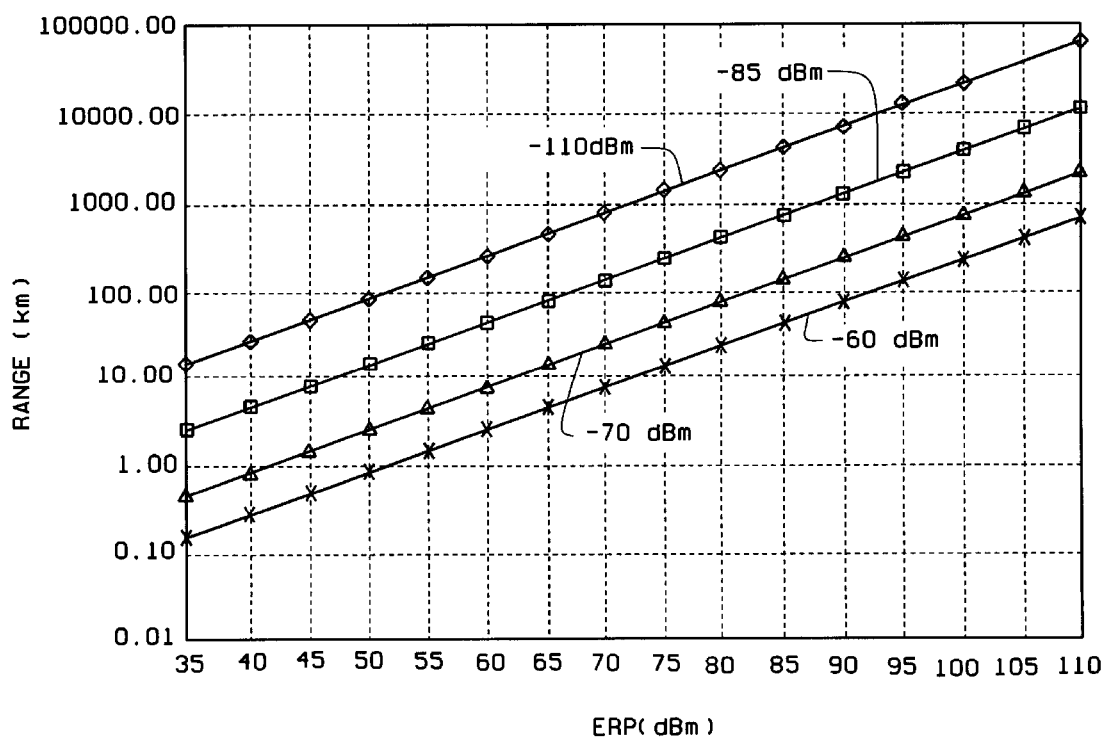
FIG. 8 is a representative graph illustrating the detection range of electronic intelligence (ELINT) detectors as a function of the effective radiated power of a radar system.

Because carrier frequency, chip rate, and hop rate are each distinguishing characteristics or attributes of a detected radar waveform, the use of these various feature analyzers allow the party intercepting the transmission to tell that they are being illuminated, and often by whom. As noted in the background discussion, various techniques have been employed to avoid detection. One strategy is to fly closer to the earth's surface (the dashed line plane in FIG. 13). Or, the radar transmits a lower power signal so the peaks P in FIG. 6B disappear into the noise. In this latter regard, FIG. 8 is a graph depicting the relative detection range for an electronic intelligence (ELINT) detector E. While FIG. 8 is representative for one band of radar frequencies, it will be understood that a similar graph could be presented for other radar frequency bands as well. The abscissa of the graph is detection range, the ordinate effective radiated power (ERP) for a radar system R. Further, four different power levels (the sloping lines) are represented with each line representing a different sensor sensitivity level. The top line is for the most sensitive sensor level, and the lowest line, the least sensitive sensor level. What this indicates is that for the given capabilities of an ELINT detector, the lower the effective radiated power of a radar system, the closer the platform can get to the detector before the detector is capable of determining the presence of the radar. Regardless, use of the feature detectors described above still enables detection and analysis of a conventional radar waveform to be achieved.

Figure 1:
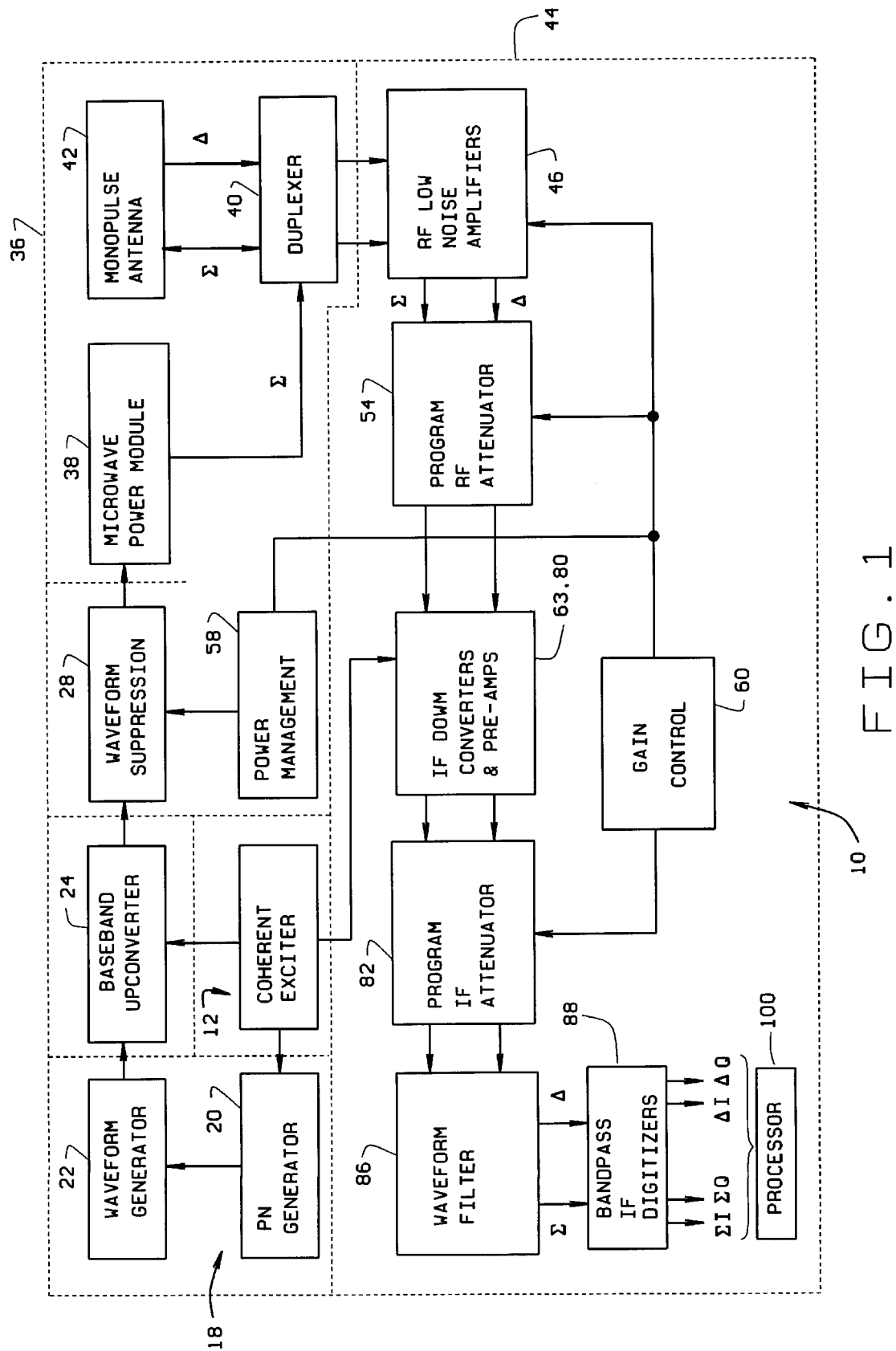
FIG. 1 is a block diagram of a system of the present invention for generating, transmitting, receiving, and processing a virtual noise waveform.

Apparatus 10 of the present invention is shown in FIG. 1. The apparatus is for use in a radar system for generating a radar waveform which has no discernible attributes. What this means is that if the waveform of FIG. 6A is processed by the feature detectors F1–F3, the result would be a signal indistinguishable from the noise portion of the FIG. 6B waveform. However, the received, return waveform resulting from the transmitted waveform energy striking the target and being reflected back to the apparatus would have sufficiently recognizable features so the apparatus could process the return signal and obtain useful target information.

Apparatus 10 includes a carrier means 12 for generating a carrier wave having a frequency C within a predetermined band of frequencies. As is well known in the art, there are different bands of radar frequencies. Means 12 may be capable of generating the carrier frequency in any preferred frequency band. For this purpose, means 12, which is a coherent exciter, includes a stable frequency reference 14 for a given frequency band. The output of this reference is supplied to a synthesizer 16 for matching the frequency reference with other portions of the apparatus.

Next, the apparatus includes a virtual noise waveform generation means 18. Means 18 includes a generator 20 for generating a series of pulses in a pseudo-random pattern. The generator generates digital pulses at very high code rate, this rate being at least four (4) times higher than that necessary for the information bandwidth required of the transmitted waveform. A repetition rate on the order of 8–10 times faster than that at which a noise generator would normally produce such pulses is readily achievable. Further, the generator is operated to generate pulses in accordance with a predetermined coding scheme. The scheme employed may be variable in accordance with the type of target interrogation being performed by the apparatus. The output from the pseudo-noise generator is applied to a pulse or waveform generator 22. This generator takes the digital pulse output of generator 20 and converts it into a waveform of an intermediate frequency (IF). Waveform generator 22 is supplied two inputs from coherent exciter 12.

Figure 17:
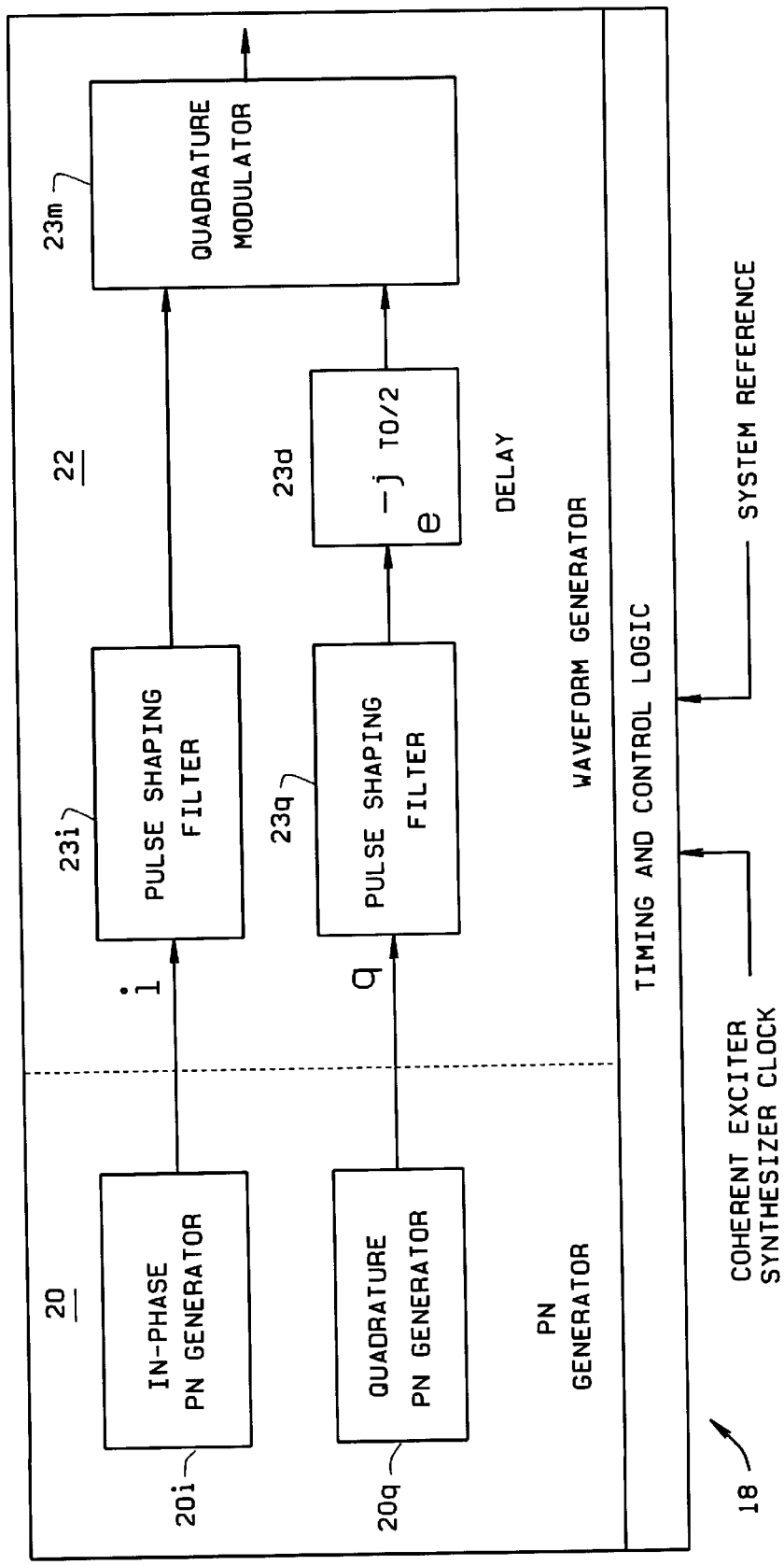

In more detail, and as shown in FIG. 17, generator 20 of waveform generation means 18 generates two independent antipodal (+/−1) psuedo-random impulse sequences. The original invention has been improved by using complementary code sets to define the pseudo-random sequences. The waveform produced by the complementary code set sequences has improved the range sidelobes over purely random sequences. These sequences are generated by an in-phase psuedo random noise generator $20i$, and a quadrature phase psuedo random noise generator $20q$. These generators respectively generate in-phase (i) and quadrature phase (q) code message sequences which are supplied to waveform generator 22 and the respective in-phase and quadrature phase code sequences have a code rate substantially higher than that required for radar range resolution. Further, the psuedo-random pattern may be based upon complementary sequences; for example, by members of the Golay family of complementary code pairs. Specifically, the code pairs include members of the Welti-D class of Golay codes. Alternatively, the complementary sequences can be transmitted in sets of Hadamard codes. Generator 22 includes two finite impulse response (FIR) filters $23i$ and $23q$ to which the i and q sequences are respectively supplied. The filters act as pulse shaping networks for the psuedo random impulse sequences. The original invention has been further improved by defining these pulse shaping filters to have a spectral response characteristic whose shape is a raised cosine. In particular, the preferred set of coefficients are those of a truncated Nyquist pulse. The filtered output from filter $23q$ is applied to a delay module $23d$ where the filtered quadrature sequence is delayed by a factor $(T_0/2)$ where $T_0$ is the axis chip length and is inversely proportional to the FIR filter bandwidth. The resulting i and q sequences are supplied to a quadrature modulator 23 m for upconversion to a suitable offset frequency for subsequent use by baseband upconverter 24. Waveform generator means 18 is supplied timing and control inputs from coherent exciter 12. One input is a systems reference input, the other a direct digital synthesizer (DDS) clock input. This latter input is used to synchronize operation of the coherent exciter 12, psuedo-random generator 18, and waveform generator 22.

Figure 10:
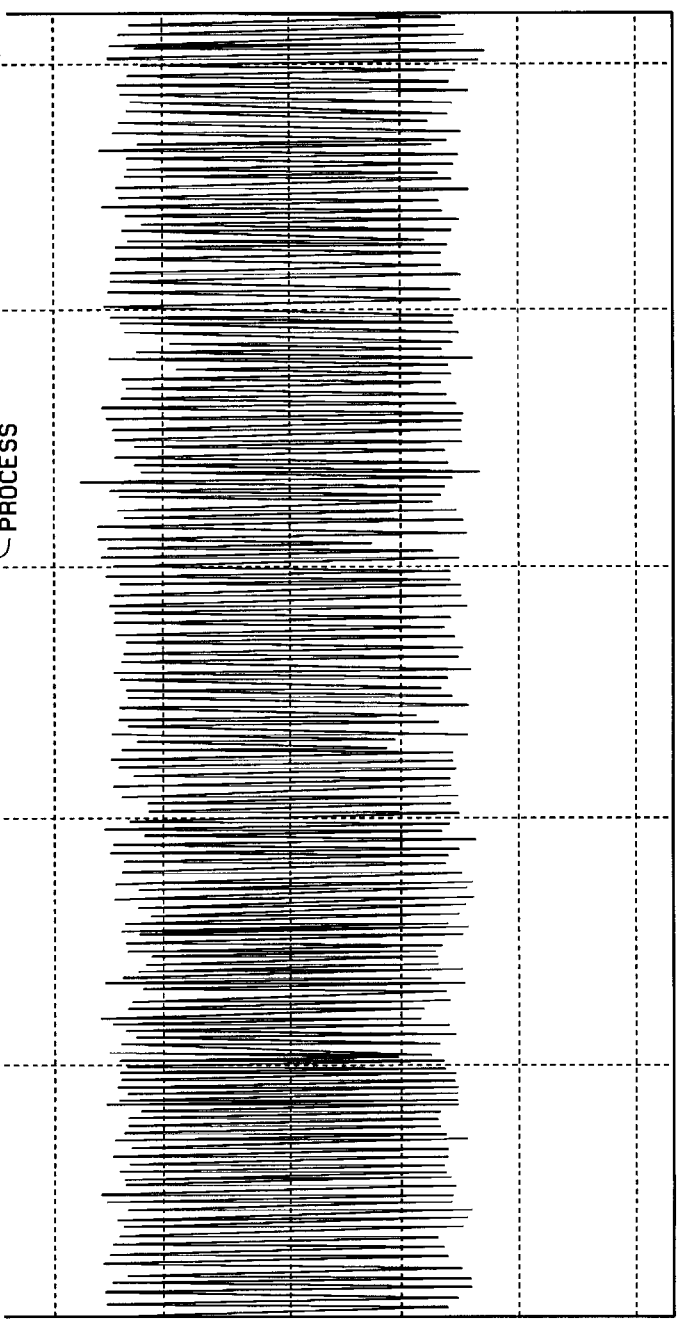
FIG. 10 is a representation of a Nyquist pulse waveform as a function of time.

By producing the input pulse stream in this manner, it is possible to produce a waveform such as shown in FIG. 10. Now, instead of a recognizable bit stream, the output of the generator appears as a random noise signal. However, any waveform attributes which might still be discernible by a feature detector are subsequently suppressed in accordance with the further waveform processing as described hereinafter. It will be understood that the operation of the waveform generator is a function of the desired information being sought. For example, in FIG. 12, a waveform is shown which may be used to obtain ranging information.

Figure 7:
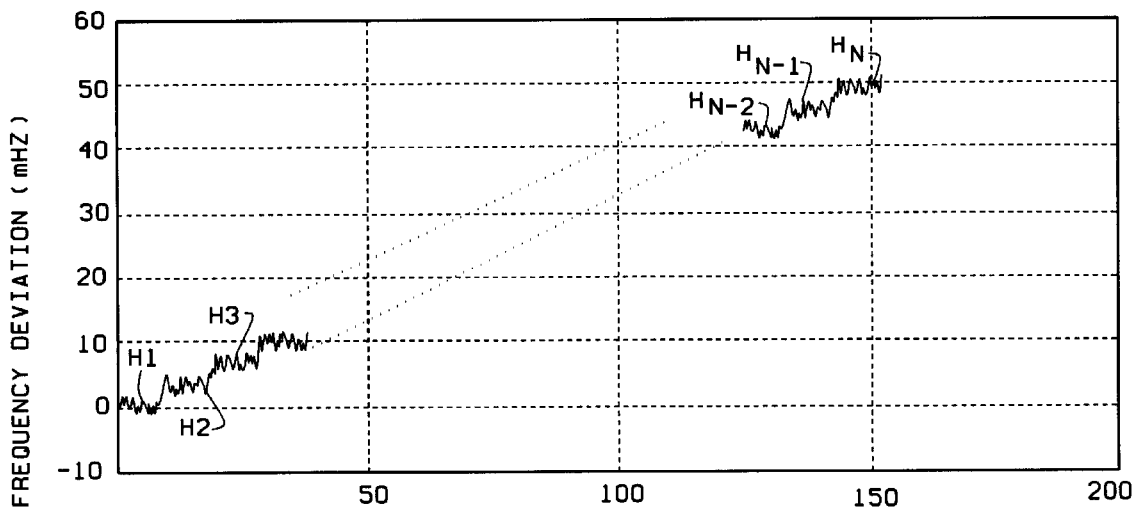
FIG. 7 represents a frequency spectrum and illustrates spectrum hopping of a transmitted radar waveform.

The output waveform of generator 22 and the carrier waveform from exciter 12 are supplied to an upconverter 24. The carrier waveform is supplied to the upconverter through a three way power divider 25. In upconverter 24, the carrier waveform is modulated with the waveform produced by generator 22 in an image reject mixer 26. It will be understood that the output waveform of coherent exciter 12 or waveform generator 18 may be shifted in frequency (hopped) at different times. This frequency hopping is shown in FIG. 7. It will further be understood that while the frequency hopping pattern shown in this drawing presents a stairstep pattern, in actuality, the hopping pattern is a random one. Thus, instead of the sequence H1, H2, H3, . . . Hn−1, Hn of carrier frequencies shown in FIG. 7, the actual sequence may be H1, H3, Hn−1, H2, Hn, etc. In FIG. 10, the modulated waveform for the portion of signal at one frequency, frequency H1, for example is shown. Additionally, the carrier is suppressed in an $n^{th}$ order detector where n is equal to one-half the ratio of the overall code rate (the sum of the in-phase and quadrature phase code rates) to the filter bandwidth.

Figure 2:
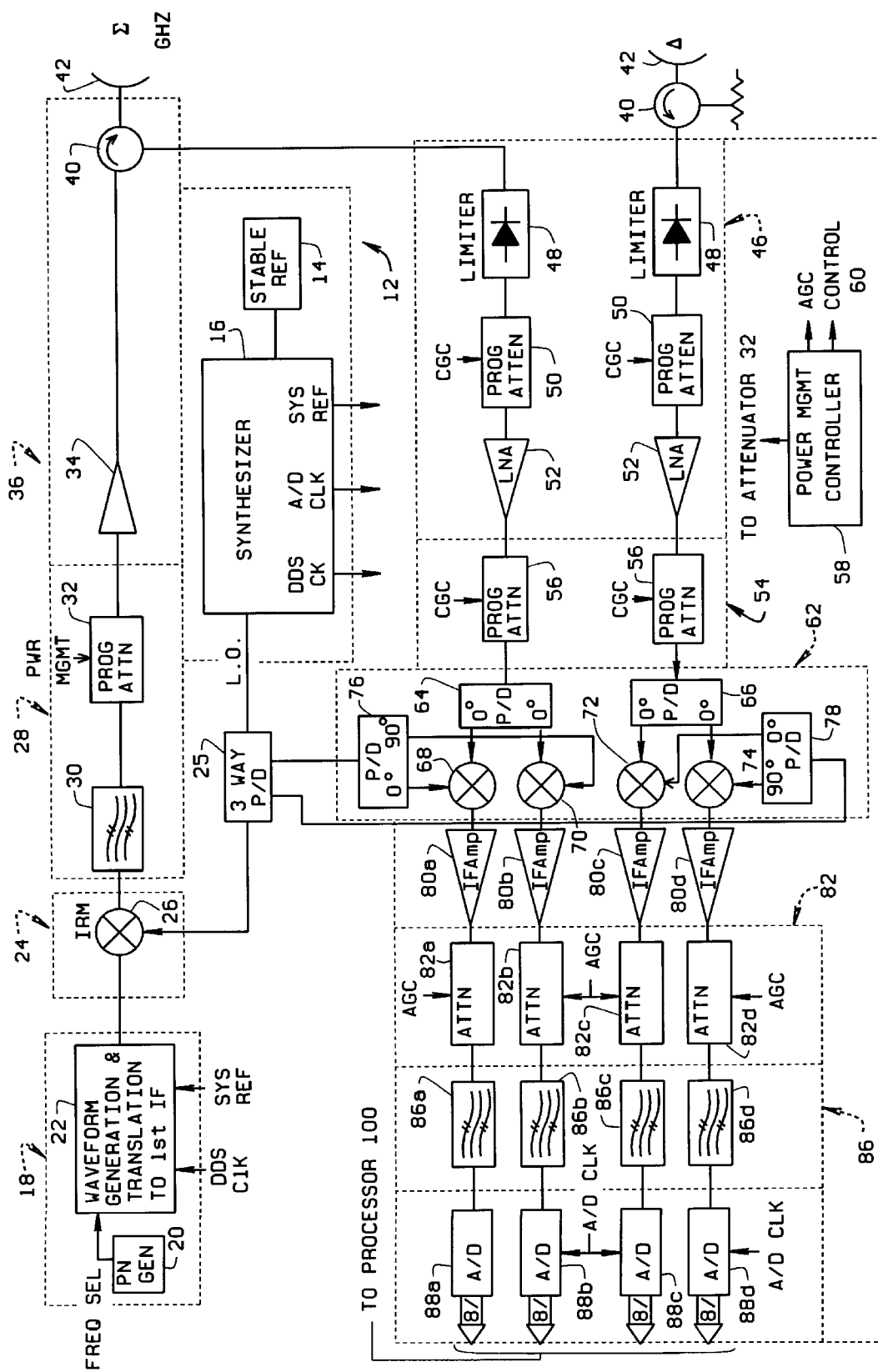
FIG. 2 is block diagram of the waveform generator, transmitter, and receiver of the system.
Figure 16A:
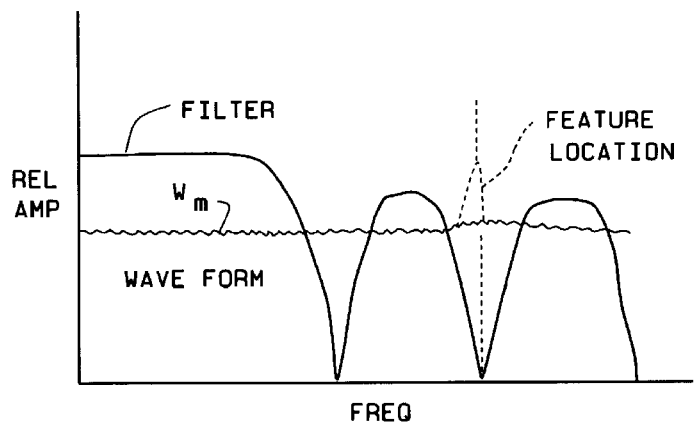
FIG. 16A illustrates the suppression of a waveform feature by a filter of the suppression means.
Figure 16B:
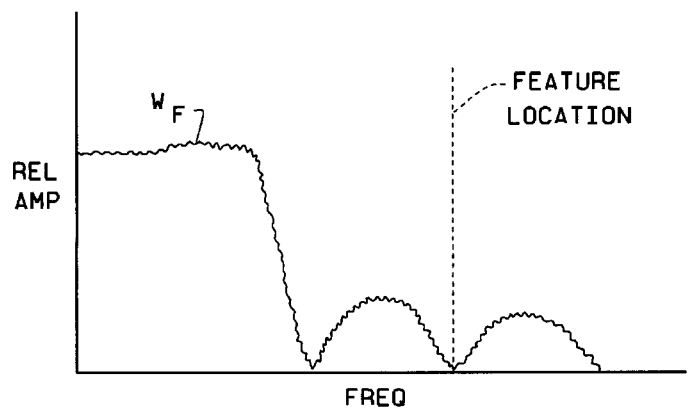
FIG. 16B illustrates the resultant transmitted, featureless waveform; and, FIG. 17 is a block diagram of the waveform generation means.
Figure 11:
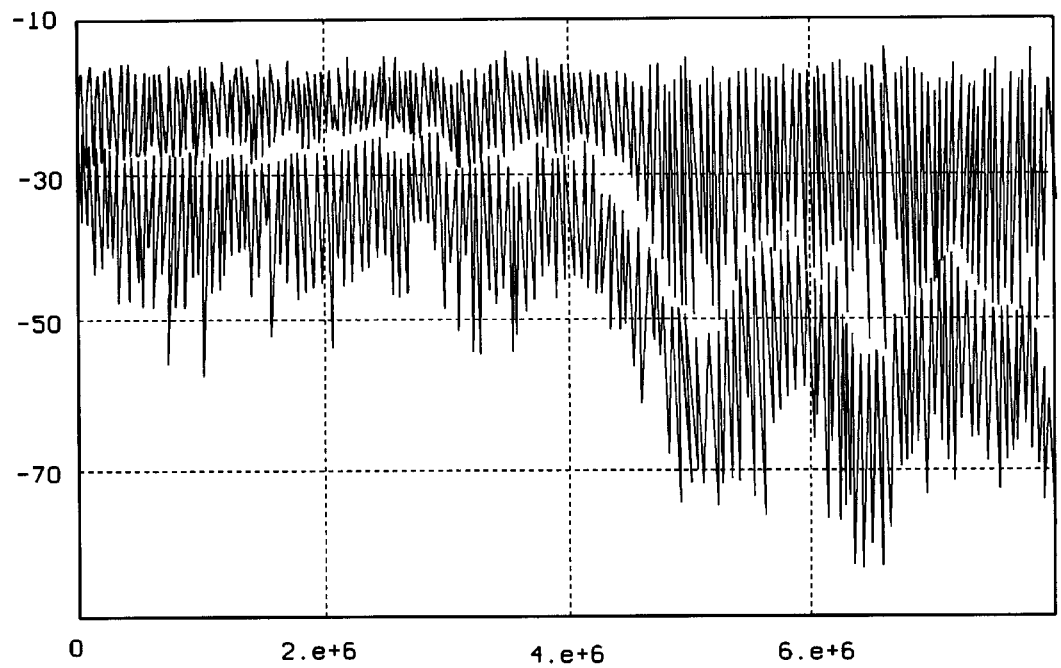
FIG. 11 is a similar representation of the waveform as a function of frequency.
Figure 14:
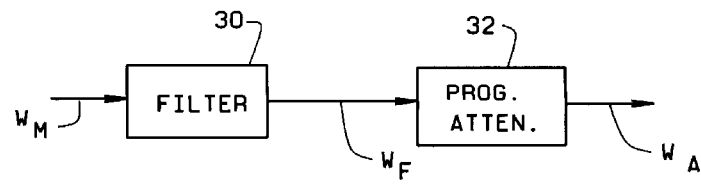
FIG. 14 illustrates operation of a waveform suppression means of the apparatus for producing a radar signal having no discernible attributes.

The output from the upconverter is now supplied to a means 28 for filtering and attenuating the characteristics of the resulting modulated waveform. As shown in FIG. 2, means 28 first includes a filter 30 followed by a programmable attenuator 32. Operation of means 28 for waveform suppression can be described with reference to FIG. 14. The modulated waveform indicated Wm in FIG. 14 represents an unfiltered transmit waveform. This waveform is supplied to the input of filter 22 which selectively filters the waveform. The resulting waveform, Wf in FIG. 14, has a bandwidth which, for example, is only one-tenth that of the input waveform. Further, as shown in FIG. 14, the feature of the input waveform is located in a null portion of the filter. That is, the feature portion of the waveform passed by the filter is on the order of 20 db–30 db below the peak level of the waveform. This greatly reduces the energy of the transmitted feature making it harder to detect the waveform. This feature suppression is further shown in FIGS. 16A and 16B. In FIG. 16A, the waveform Wm is superimposed on the filter characteristics. Here, the feature location (pulse peak shown in FIG. 12) now occurs at a null in the filter. The resultant waveform from the filter is shown in FIG. 16B with the peak location feature now suppressed so as to not be discernible.

From the filter, the waveform Wf is applied to a programmable attenuator 32. Attenuator 32 further serves to reduce any remaining power peaks in the waveform that might lead to detection of the transmitted waveform by a detector. The amount of attenuation is controlled, as described hereinafter, so that even though the transmitted waveform is now a low energy or virtual noise waveform having no attributes discernible by a feature detector, the waveform still has sufficient energy that a received return waveform from the target can be processed to yield desired information about the target. The output from attenuator 32 is a waveform Wa. This waveform is now supplied to through a linear amplifier 34 to a propagation means 36.

Figure 15:
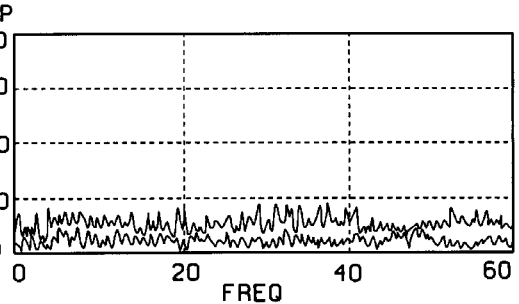
FIG. 15 represents a virtual noise waveform of the present invention when processed by a square law detector.

Propagation means 36 transmits the waveform Wa and receives a return waveform which is processed to obtain the desired information. The output from the linear amplifier is supplied to a duplexer 40 which services a radar antenna 42. The virtual noise waveform transmitted by the antenna is a low power waveform as a result of the filtering by filter 30 and further suppression by attenuator 32. The result is that the transmitted waveform is as shown in FIG. 15. Here, the waveform, which is shown as a waveform resulting from processing by a square law detector F1, has no discernible features. In particular, the peaks P which are prevalent in the processed waveform of FIG. 6B, are not present because they are not there to be detected in the first place. Although not shown, it will be understood that the other feature analyzers previously discussed would similarly produce no results enabling an investigator to determine that a radar illumination is taking place.

Apparatus 10 further includes means 44 for initially processing the received return waveform to obtain pertinent information about a target at which the transmitted waveform is directed. The output of receiver means 44 is provided to a processor 100 (see FIG. 9) where a cross-correlation is performed between the transmitted and return waveforms to obtain target information. From duplexer 40, the return signal is divided into separate processing channels, a Σ channel for energy, and a channel Δ for azimuth and/or elevation and position determination. The duplexer outputs are respectively applied to the inputs of a low noise amplification module 46 having two separate and identical channels. Each channel includes a limiter 48 through which the respective signals are supplied to a programmable attenuator 50. The output from each attenuator is then supplied to a linear noise amplifier 52.

After amplification, each channel output is supplied as an input to a programmable RF attenuator module 54 comprising separate programmable attenuators 56. Both the attenuators 56 and attenuator 32 have gain control inputs for adjusting the resulting signal level of the return waveform so it is sufficient for processing. A power management controller 58 provides an output to both attenuator 32 of suppression means 28, and to an automatic gain controller 60. Controller 60 controls the attenuation level of both of the programmable attenuators 50 and 56.

Next, the Σ and Δ channel signals are applied to an IF downconverter and preamplifier 62. The carrier frequency of coherent exciter 16 is supplied through three-way power divider 25 to a downconverter 63. Each separate channel input is first applied to a power divider, the Σ channel to a power divider 64, and the Δ channel to a power divider 66. These channels are further divided into two separate sub-channels, the sub-channels are supplying inputs to separate mixers. The two sub-channels for the Σ channel are applied to respective mixers 68, 70, and those for the Δ channel to mixers 72, 74. Each output from each of these power dividers is an in-phase output. One output from power divider 25 is supplied to a power divider 76 where the carrier frequency is divided into in-phase and quadrature phase components. The in-phase output from power divider 76 is supplied to mixer 68, the quadrature phase component to mixer 70. Similarly, a second output from power divider 25 is supplied to a power divider 78. This power divider similarly has in-phase and quadrature phase components, these being respectively supplied to mixers 72 and 74. After downconversion, the two in-phase and two quadrature phase signals are supplied to respective preamplifiers, 80a–80d.

After amplification, the in-phase and quadrature signals are supplied to a programmable RF attenuator module 82 comprising respective programmable attenuators 82a–82d. Each of these attenuators is supplied a control input from gain controller 60. The output from each attenuator 82 is supplied to one filter 86a–86d of a waveform filter module 86. After filtering, the respective waveforms are applied to analog-to-digital (A/D) converters 88a–88d of a digitizer module 88. The converters are supplied a clock signal from coherent exciter 16. Each converter produces an 8-bit digital output, for example, which is used for further signal processing by processor 100 for mapping a target area for obtaining other target information.

Figure 9:
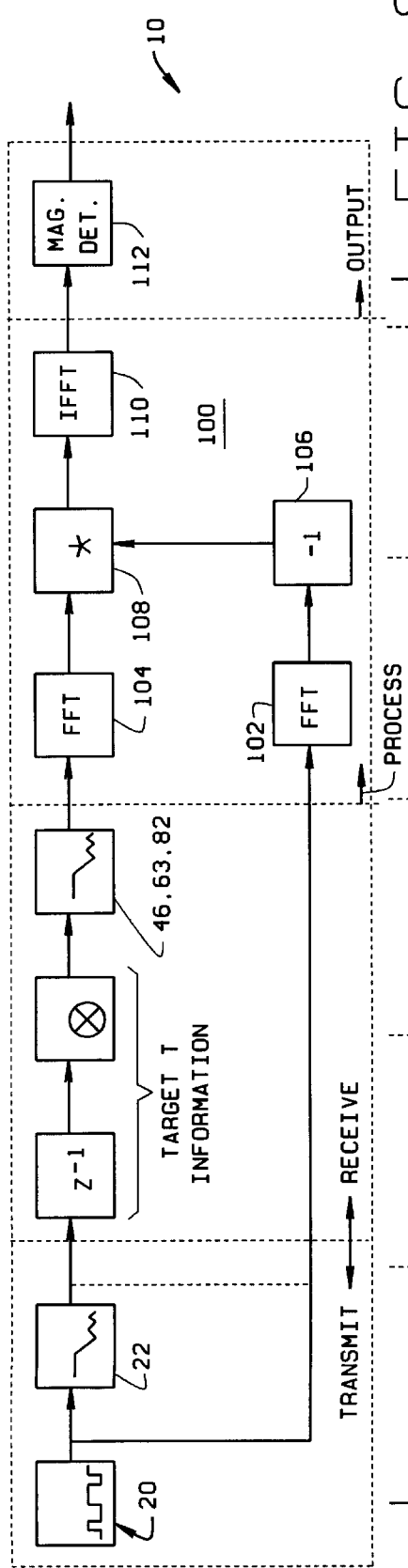
FIG. 9 is a block diagram of a Nyquist waveform generator for producing a desired waveform and the signal processing required to extract target information being sought from the received radar return signal.

In summary, and as shown in FIG. 9, apparatus 10 is based upon a Nyquist signal model. A sequence of pseudo randomly generated digital pulses from generator 20 are supplied to Nyquist filter 22. The generator 20 output may also be sent to a Fast Fourier Transform (FFT) 102 of signal processor 100, or the output of filter 22 may be routed to this FFT. The transmitted waveform illuminates target T and the return waveform is directed to processor 100 through a receiver electronics 46, 62, 82. The resulting signal is then applied to a Fast Fourier Transform 104. The output of FFT 102 is converted to its complex conjugate at 106. The output of 106 and FFT 104 are multiplied together at 108. Those skilled in the art will recognize that processor 100 is performing a cross-correlation on the return waveforms. The resulting waveform is now supplied to an inverse FFT 110 for further waveform processing. The waveform, which now resembles that shown in FIG. 12, is passed through a magnitude detector 112 which is used to monitor and control the waveform peak of the final waveform. Rather than performing a conventional cross-correlation, processor 100 performs an alternative cross-correlation with a reference for the cross-correlation being the unfiltered output of generator 20.

What has been described is an apparatus and a method for generating a non-detectable radar waveform transmissible from an appropriate platform at a target to obtain desired information about the target. The waveform is a virtual noise waveform having no discernible attributes so the waveform appears as a random occurrence and does not reveal either its presence or any information about the source of the waveform to a waveform analyzer or interrogator. Importantly, the apparatus and method of the invention facilitates covert radar operations by preventing long range detection and ready identification of a radar waveform by an enemy. The waveform generated by the apparatus and method of the invention is a low peak power waveform which is generated using pseudo-random noise generation techniques. Other techniques employed in generating the waveform may include coherent integration, coherent frequency hopping, and continuous phase. The virtual-noise waveform modulates a carrier wave, and the resulting signal is filtered and attenuated so that the resulting waveform appears only in a narrow portion of a broad frequency spectrum and any characteristic features of the waveform are greatly suppressed. Suppression of the features of the finally transmitted waveform are such that it has no discernible attributes by which it can be identified as to a source of origin. The apparatus and method provide for a received, return signal to be readily detected and processed so as to provide desired information about the target at which the transmitted waveform was directed. Use of the apparatus and method to produces an undetectable radar signal usable in a wide variety of radar applications which are similar to those for which conventional radar signals are used. This is done without any degradation in the performance of a radar system, and the apparatus and method of the invention can be implemented with existing radar systems.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

We claim:

1. In apparatus generating a radar waveform and including a psuedo-random noise generator generating pulses in a pseudo-random pattern which are combined to produce an offset frequency signal, means generating a carrier wave having a frequency within a predetermined band of frequencies, and a modulator modulating the carrier wave with the offset frequency signal, the improvement wherein said psuedo random noise generator includes a pulse shaping filter suppressing modulation characteristics of said psuedo-random noise generator, said filter having a spectral response characteristic including raised cosine shapes; and, a propagation means transmitting the modulated waveform and for receiving a return waveform, the transmitted waveform having no discernible attributes by which the waveform, if received and analyzed by a detector other than the propagation means, would convey any intelligence as to the presence of the transmitted waveform or the source thereof.

2. The improvement of claim 1 wherein said pulse shaping filter is a truncated Nyquist filter.

3. The improvement of claim 1 wherein said psuedo-random noise generator generates in-phase and quadrature-phase code sequences at a code rate substantially greater than that required for radar range resolution.

4. The improvement of claim 1 wherein said carrier wave is supressed in an $n^{th}$ order detector in which n is equal to one-half the ratio of the overall code rate to the bandwidth of said filter.

5. The improvement of claim 2 further including processing means processing a received, return waveform to obain pertinent information about a target at which a transmitted waveform is directed, said processing means performing a cross-correlation on the received waveform using as a reference an unfiltered output of said psuedo-random noise generator.

6. The improvement of claim 1 wherein said psuedo random pattern is based upon complementary code sequences.

7. The improvement of claim 6 wherein said complementary sequence is a member of the Golay family of complementary code pairs.

8. The improvement of claim 7 wherein said code pairs are members of the Welti-D class of Golay codes.

9. The improvement of claim 6 wherein said complementary sequence is transmitted in sets of Hadamard codes.

10. In apparatus for generating a virtual noise waveform and including a generator generating a series of coded digital electrical pulses in a pseudo-random pattern, means modulating a carrier wave with the pulses to produce a modulated waveform, a filter filtering the resulting modulated waveform for an output waveform from the filter to fall within a null portion of the filter for the waveform energy of the output from the filter to be at a minimum level, the bandwidth of the filtered waveform being sufficient to enable the waveform to obtain desired information when directed at an area of interest, and an attenuator attenuating the filtered waveform to sufficiently suppress any remaining features of the waveform so to produce a virtual noise waveform which appears as a random noise signal having no discernible attributes and conveying no information about the waveform or its source, the improvement comprising a pulse shaping filter suppressing modulation characteristics of said electrical pulse generator, said filter having a spectral response characteristic including raised cosine shapes.

11. The improvement of claim 10 wherein said pulse shaping filter is a truncated Nyquist filter.

12. The improvement of claim 10 wherein said coded digital electrical pulses are generated in a psuedo random pattern using complementary code sequences.

13. The improvement of claim 12 wherein said complementary sequence is a member of the Golay family of complementary code pairs.

14. The improvement of claim 13 wherein said code pairs are members of the Welti-D class of Golay codes.

15. The improvement of claim 12 wherein said complementary sequence is transmitted in sets of Hadamard codes.

16. The improvement of claim 10 wherein said psuedo-random noise generator generates in-phase and quadrature-phase code sequences at a code rate substantially greater than that required for radar range resolution.

17. In a method of generating a virtual noise waveform including the steps of generating two series of digital pulses in a pseudo-random pattern, combining the respective series of pulses to produce an offset frequency, modulating a carrier wave with the offset frequency to produce a modulated waveform, and suppressing the characteristics of the resulting modulated waveform for the waveform to have no discernible attributes which would convey any information about the existence of the waveform or its source, the improvement comprising filtering said digital pulses with a pulse shaping filter to suppress modulation characteristics of said waveform, said filter having a spectral response characteristic including raised cosine shapes.

18. The improvement of claim 17 wherein said filtering of said digital pulses is performed with a truncated Nyquist filter.

19. The improvement of claim 17 wherein said two series of pulses are generated in a psuedo random pattern using complementary code sequences.

20. The improvement of claim 19 wherein said complementary sequence is a member of the Golay family of complementary code pairs.

21. The improvement of claim 20 wherein said code pairs are members of the Welti-D class of Golay codes.

22. The improvement of claim 20 wherein said complementary sequence is transmitted in sets of Hadamard codes.

23. The improvement of claim 17 wherein said two series of pulses are generated at a code rate substantially greater than that required for radar range resolution.

24. In a method of generating a radar waveform including generating an in-phase series and a quadrature-phase series of coded pulse sequences in a pseudo-random pattern, combining the two series of coded pulse sequences into an offset frequency, generating a carrier wave having a frequency within a predetermined frequency band, modulating said carrier wave with said offset frequency, filtering the modulated waveform so the waveform energy is concentrated within a narrow bandwidth corresponding to the bandwidth required for information gathering, the energy of the resulting filtered waveform being substantially less than that of the unfiltered modulated waveform, attenuating the filtered waveform to suppress any features therein and to eliminate any discernible features of the filtered waveform, and transmitting the resulting waveform and receiving a return waveform, said transmitted waveform, if received and analyzed by a detection means other than that associated with the source of the waveform, appearing as a random noise signal having no discernible attributes and conveying no information about the waveform or its source, the improvement comprising filtering said coded pulse sequences with a pulse shaping filter to suppress modulation characteristics of said waveform, said filter having a spectral response characteristic including raised cosine shapes.

25. The improvement of claim 24 wherein filtering of said coded pulse sequences is performed with a truncated Nyquist filter.

26. The improvement of claim 24 wherein said two series of pulses are generated in a psuedo random pattern using complementary code sequences.

27. The improvement of claim 26 wherein said complementary sequence is a member of the Golay family of complementary code pairs.

28. The improvement of claim 27 wherein said code pairs are members of the Welti-D class of Golay codes.

29. The improvement of claim 27 wherein said complementary sequence is transmitted in sets of Hadamard codes.

30. The improvement of claim 24 further including processing said received, return waveform to obtain pertinent information about a target at which said modulated waveform is transmitted, said processing including performing a cross-correlation on the received waveform using as a reference an unfiltered output of said coded electrical digital pulses.

* * * * *